United States Patent
Spence et al.

(10) Patent No.: US 12,198,133 B2
(45) Date of Patent: Jan. 14, 2025

(54) METHOD AND SYSTEM FOR ENABLING E-COMMERCE VIA DIGITAL WALLETS

(71) Applicant: MASTERCARD INTERNATIONAL INCORPORATED, Purchase, NY (US)

(72) Inventors: Liam Spence, Mount Kisco, NY (US); Skyler Fox, Park Ridge, NJ (US); Joseph Hayes, Montclair, NJ (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 629 days.

(21) Appl. No.: 17/502,198

(22) Filed: Oct. 15, 2021

(65) Prior Publication Data

US 2023/0123311 A1    Apr. 20, 2023

(51) Int. Cl.
  *G06Q 20/40*    (2012.01)
  *G06Q 20/36*    (2012.01)
  *G06Q 20/38*    (2012.01)

(52) U.S. Cl.
  CPC .......... *G06Q 20/401* (2013.01); *G06Q 20/36* (2013.01); *G06Q 20/3821* (2013.01); *G06Q 20/385* (2013.01)

(58) Field of Classification Search
  CPC .. G06Q 20/401; G06Q 20/36; G06Q 20/3821; G06Q 20/385; G06Q 20/351; G06Q 20/38215; G06Q 20/3674; G06Q 20/12
  See application file for complete search history.

(56) References Cited

U.S. PATENT DOCUMENTS

| | | | |
|---|---|---|---|
| 6,636,833 B1 | 10/2003 | Flitcroft et al. | |
| 7,136,835 B1 | 11/2006 | Flitcroft et al. | |
| 7,567,934 B2 | 7/2009 | Flitcroft et al. | |
| 7,571,142 B1 | 8/2009 | Flitcroft et al. | |

(Continued)

OTHER PUBLICATIONS

Google Pay (Year: 2021).*
Mobile Digital Wallets (Year: 2018).*
Tokenization Explained (Year: 2020).*

*Primary Examiner* — Radu Andrei
*Assistant Examiner* — Nakia Leffall-Allen
(74) *Attorney, Agent, or Firm* — Panitch Schwarze Belisario & Nadel LLP

(57) ABSTRACT

A method for supplying a controlled payment number for use on behalf of a tokenized payment account in a digital wallet for e-commerce includes: receiving, by a wallet server, at least a token identifier from an external computing device, the token identifier being associated with a tokenized payment account in the external computing device; transmitting, by the wallet server, at least the token identifier and a request flag to a processing server; identifying, by the processing server, a transaction account number associated with the token identifier, wherein the transaction account number corresponds to the payment account; identifying, by the processing server, a controlled payment number corresponding to the payment account; receiving, by the wallet server, the identified controlled payment number from the processing server; and transmitting, by the wallet server, the identified controlled payment number to the external computing device.

14 Claims, 6 Drawing Sheets

(56) References Cited

U.S. PATENT DOCUMENTS

| | | | |
|---|---|---|---|
| 7,593,896 | B1 | 9/2009 | Flitcroft et al. |
| 11,134,075 | B2* | 9/2021 | Ebrahimi ............ H04L 63/0861 |
| 2002/0161707 | A1* | 10/2002 | Cole ...................... G06Q 30/06 |
| | | | 705/42 |
| 2003/0028481 | A1* | 2/2003 | Flitcroft ................ G06Q 20/34 |
| | | | 705/39 |
| 2009/0037333 | A1 | 2/2009 | Flitcroft et al. |
| 2009/0070260 | A1 | 3/2009 | Flitcroft et al. |
| 2009/0134217 | A1 | 5/2009 | Flitcroft et al. |
| 2011/0040686 | A1* | 2/2011 | Carlson .............. G06Q 20/4012 |
| | | | 705/44 |
| 2014/0129435 | A1* | 5/2014 | Pardo ..................... G06Q 20/36 |
| | | | 705/41 |
| 2016/0028550 | A1* | 1/2016 | Gaddam ............. H04L 63/0823 |
| | | | 713/173 |
| 2019/0188696 | A1* | 6/2019 | Carpenter .............. G06Q 20/36 |
| 2020/0019964 | A1* | 1/2020 | Miller ............... G06Q 20/38215 |
| 2021/0279699 | A1* | 9/2021 | Royyuru ............ G06Q 20/3672 |
| 2022/0247579 | A1* | 8/2022 | Bester ................... H04W 12/06 |
| 2023/0214829 | A1* | 7/2023 | Braundmeier ....... G06Q 20/385 |
| | | | 705/39 |

* cited by examiner

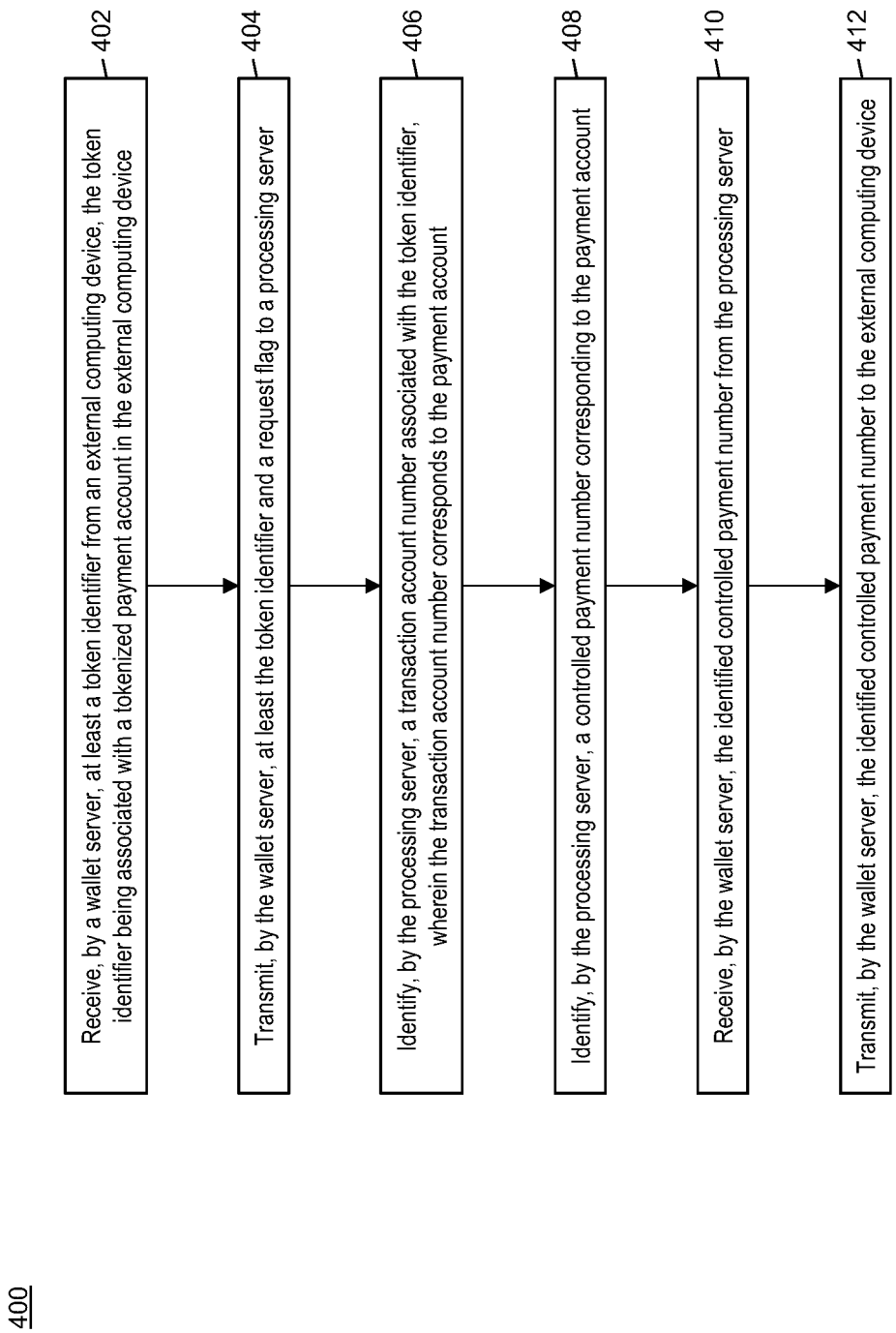

METHOD AND SYSTEM FOR ENABLING E-COMMERCE VIA DIGITAL WALLETS

FIELD

The present disclosure relates to enabling e-commerce via digital wallets, specifically the use of controlled payment numbers to enable a tokenized payment account of a digital wallet to be used in an e-commerce transaction without exposing the underlying transaction account number.

BACKGROUND

As technology improves, consumers use their personal computing devices for more and more of their daily actions and interactions. One such area where technology has progressed is in the payments industry, where payment cards have been utilized for e-commerce transactions for many years. Because of the dangers of fraud and the theft and compromise of credit card numbers, payment networks, merchants, and financial institutions have constantly sought to develop methods for protecting transaction account numbers while, at the same time, maintaining a high level of convenience and ease of use for consumers.

Along these lines, digital wallets were created, which enable payment cards to be stored in the digital wallet for use in payment transactions. Digital wallets can work in traditional point of sale transactions, where the payment card information is electronically transmitted to the point of sale, or in e-commerce transactions, where the card can be selected and its data auto-filled in a form or submitted directly to the merchant via a web page or other method. While this enables a consumer to transact without a physical card, negating the ability for it to be lost or physically stolen, the card details are still susceptible to theft during transmission.

In an effort to further protect payment cards, some digital wallets have fully tokenized payment cards, by replacing the card details with a digital token, which can be used in place of the card details. This digital token is stored in the digital wallet and electronically transmitted to a merchant, where the processing of the transaction involves the wallet provider identifying the underlying transaction account information. However, tokenized payment cards can only be used in e-commerce transactions with merchants that have customized their point of sale systems to interact with digital wallets offering such cards. As a result, millions of online retailers and small businesses may become unavailable to consumers relying on tokenized payment cards, as there are no card details available, such as a card number or expiration date, for the consumer to enter into the online portal. Thus, there is a need for a system that can enable a tokenized payment card in a digital wallet to be used in a traditional electronic payment transaction via payment card details, while still protecting the underlying card and account information.

SUMMARY

The present disclosure provides a description of systems and methods for supplying a controlled payment number for use on behalf of a tokenized payment account in a digital wallet for e-commerce. A wallet server manages a tokenized payment card on a consumer's computing device. When the consumer wants to engage in an e-commerce transaction, they can request a controlled payment number. The wallet server provides the token identifier for the payment card to a processing server, which identifies the associated transaction account. A controlled payment number is generated by the processing server or a separate generating server that is mapped to the transaction account at the back end. The controlled payment number is returned to the wallet server, which thereby provides it to the consumer on their computing device. The consumer can then use that controlled payment number in an e-commerce transaction to have the transaction funded via the transaction account. The use of the controlled payment number ensures that the consumer can use the tokenized payment card for the e-commerce transaction while protecting the underlying account information as the computing device and wallet server never possess the original transaction account number, and the transaction account number is never transmitted and thus cannot be intercepted, resulting in a secure system that provides more convenience to consumers.

A method for supplying a controlled payment number for use on behalf of a tokenized payment account in a digital wallet for e-commerce includes: receiving, by a wallet server, at least a token identifier from an external computing device, the token identifier being associated with a tokenized payment account in the external computing device; transmitting, by the wallet server, at least the token identifier and a request flag to a processing server; identifying, by the processing server, a transaction account number associated with the token identifier, wherein the transaction account number corresponds to the payment account; identifying, by the processing server, a controlled payment number corresponding to the payment account; receiving, by the wallet server, the identified controlled payment number from the processing server; and transmitting, by the wallet server, the identified controlled payment number to the external computing device.

A system for supplying a controlled payment number for use on behalf of a tokenized payment account in a digital wallet for e-commerce includes: an external computing device; a wallet server; and a processing server, wherein the wallet server receives at least a token identifier from the external computing device, the token identifier being associated with a tokenized payment account in the external computing device, and transmits at least the token identifier and a request flag to the processing server, the processing server identifies a transaction account number associated with the token identifier, wherein the transaction account number corresponds to the payment account, identifies a controlled payment number corresponding to the payment account, and transmits the controlled payment number to the wallet server, and the wallet server further receives the identified controlled payment number from the processing server, and transmits the identified controlled payment number to the external computing device.

BRIEF DESCRIPTION OF THE DRAWING FIGURES

The scope of the present disclosure is best understood from the following detailed description of exemplary embodiments when read in conjunction with the accompanying drawings. Included in the drawings are the following figures:

FIG. 4 is a flow chart illustrating an exemplary method for supplying a controlled payment number for use on behalf of a tokenized payment account in a digital wallet for e-commerce in accordance with exemplary embodiments.

Figure 1:
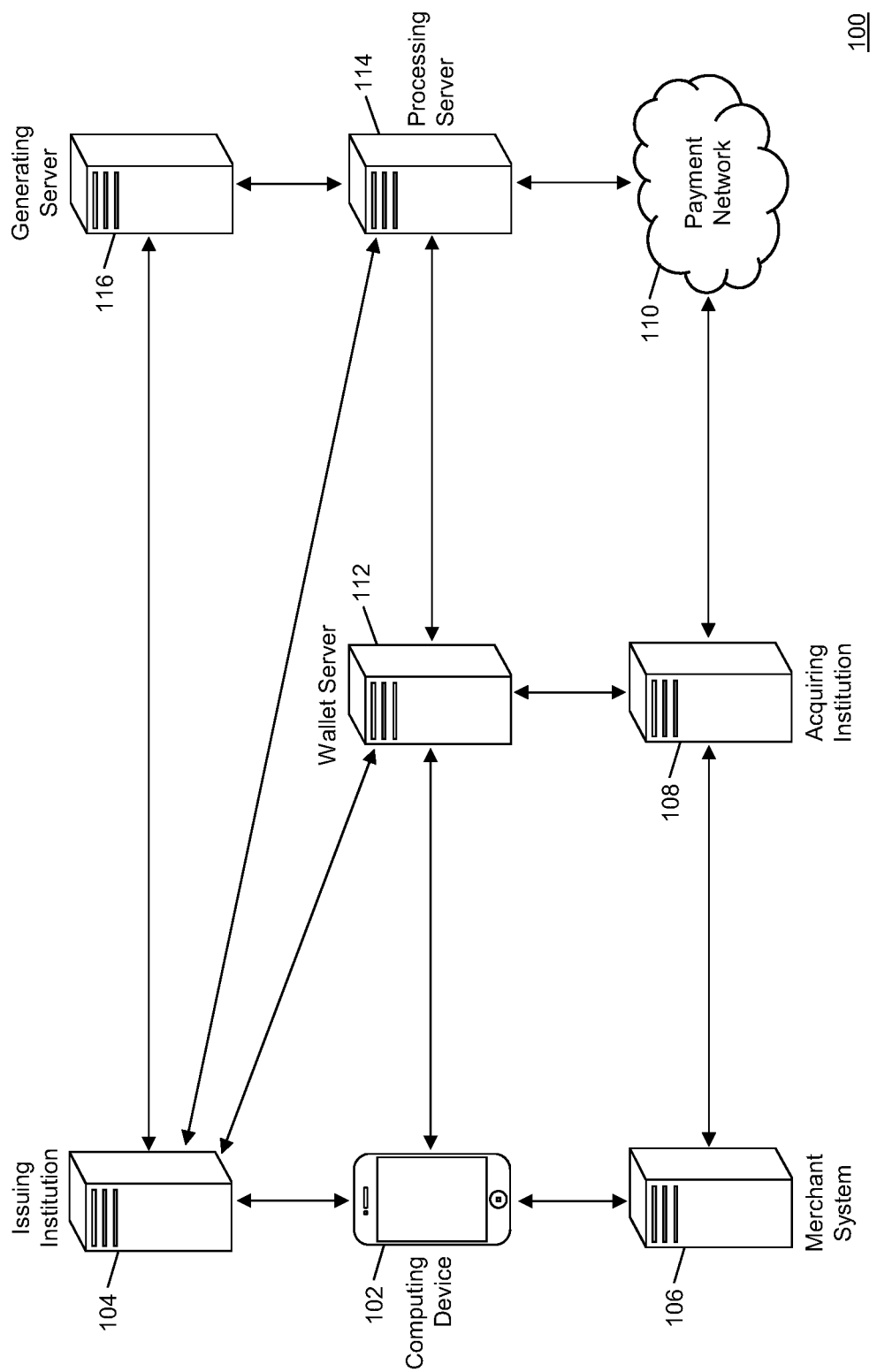
FIG. 1 is a block diagram illustrating a high level system architecture for supplying controlled payment numbers for tokenized payment cards for use in e-commerce transactions in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes for thousands, millions, and even billions of transactions during a given period. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by Mastercard®, VISA®, Discover®, American Express®, PayPal®, etc. Use of the term "payment network" herein may refer to both the payment network as an entity, and the physical payment network, such as the equipment, hardware, and software comprising the payment network.

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

Issuer—An entity that establishes (e.g., opens) a letter or line of credit in favor of a beneficiary, and honors drafts drawn by the beneficiary against the amount specified in the letter or line of credit. In many instances, the issuer may be a bank or other financial institution authorized to open lines of credit. In some instances, any entity that may extend a line of credit to a beneficiary may be considered an issuer. The line of credit opened by the issuer may be represented in the form of a payment account, and may be drawn on by the beneficiary via the use of a payment card. An issuer may also offer additional types of payment accounts to consumers as will be apparent to persons having skill in the relevant art, such as debit accounts, prepaid accounts, electronic wallet accounts, savings accounts, checking accounts, etc., and may provide consumers with physical or non-physical means for accessing and/or utilizing such an account, such as debit cards, prepaid cards, automated teller machine cards, electronic wallets, checks, etc.

Acquirer—An entity that may process payment card transactions on behalf of a merchant. The acquirer may be a bank or other financial institution authorized to process payment card transactions on a merchant's behalf. In many instances, the acquirer may open a line of credit with the merchant acting as a beneficiary. The acquirer may exchange funds with an issuer in instances where a consumer, which may be a beneficiary to a line of credit offered by the issuer, transacts via a payment card with a merchant that is represented by the acquirer.

Payment Transaction—A transaction between two entities in which money or other financial benefit is exchanged from one entity to the other. The payment transaction may be a transfer of funds, for the purchase of goods or services, for the repayment of debt, or for any other exchange of financial benefit as will be apparent to persons having skill in the relevant art. In some instances, payment transaction may refer to transactions funded via a payment card and/or payment account, such as credit card transactions. Such payment transactions may be processed via an issuer, payment network, and acquirer. The process for processing such a payment transaction may include at least one of authorization, batching, clearing, settlement, and funding. Authorization may include the furnishing of payment details by the consumer to a merchant, the submitting of transaction details (e.g., including the payment details) from the merchant to their acquirer, and the verification of payment details with the issuer of the consumer's payment account used to fund the transaction. Batching may refer to the storing of an authorized transaction in a batch with other authorized transactions for distribution to an acquirer. Clearing may include the sending of batched transactions from the acquirer to a payment network for processing. Settlement may include the debiting of the issuer by the payment network for transactions involving beneficiaries of the issuer. In some instances, the issuer may pay the acquirer via the payment network. In other instances, the issuer may pay the acquirer directly. Funding may include payment to the merchant from the acquirer for the payment transactions that have been cleared and settled. It will be apparent to persons having skill in the relevant art that the order and/or categorization of the steps discussed above performed as part of payment transaction processing.

Controlled Payment Number—Controlled payment numbers may be payment numbers associated with a payment account that are subject to one or more rules. In many cases, these rules may be set by a cardholder, such as spending limits, limits on days and/or times of a transaction, limits on merchants or industries, transaction spending or frequency limits, etc. Controlled payment numbers may offer an account holder an opportunity to give payment cards tied to the account to others for use, but subject to rules set by the cardholder, such as an employer distributing cards to employees, or a parent distributing cards to children. Additional detail regarding controlled payment numbers may be found in U.S. Pat. No. 6,636,833, issued Oct. 21, 2003; U.S. Pat. No. 7,136,835, issued Nov. 14, 2006; U.S. Pat. No. 7,571,142, issued Aug. 4, 2009; U.S. Pat. No. 7,567,934, issued Jul. 28, 2009; U.S. Pat. No. 7,593,896, issued Sep. 22, 2009; U.S. patent application Ser. No. 12/219,952, filed Jul. 30, 2008; U.S. patent application Ser. No. 12/268,063, filed Nov. 10, 2008; and U.S. patent application Ser. No. 12/359,971, filed Jan. 26, 2009; each of which are herein incorporated by reference in their entirety.

System for Supplying Controlled Payment Numbers in Digital Wallets

FIG. 1 illustrates a system 100 for supplying controlled payment numbers for use on behalf of tokenized payment accounts in digital wallets for use in e-commerce payment transactions.

The system 100 may include a computing device 102. The computing device 102 may be a device utilized by a consumer that has a digital wallet application stored therein for execution by the computing device 102 that stores tokenized payment cards for use by the consumer in electronic payment transactions. The computing device 102 may be any suitable type of computing device, such as the computing systems 200 and 500 in FIGS. 2 and 5, respectively, discussed in more detail below, such as a desktop computer, laptop computer, notebook computer, tablet computer, cellular phone, smart phone, smart television, etc.

The digital wallet on the computing device 102 may store a tokenized payment card that is associated with a transaction account for which the consumer is authorized to fund payment transactions. The transaction account may be issued to the consumer from an issuing institution 104. In traditional systems, the issuing institution 104 may issue a physical payment card (e.g., a credit card) to the consumer, which the consumer may present at a merchant system 106, such as using a point of sale device integrated therein. The merchant system 106 may (e.g., via the point of sale device) collect account details for the transaction account from the physical payment card, such as a transaction account number, name, expiration date, security code, cryptograms, transaction counters, etc. The merchant system 106 may transmit these account details along with other transaction information for the payment transaction (e.g., transaction amount, currency, transaction type, geographic location, time and date, etc.) to an acquiring institution 108, such as bank or other financial institution that issues a transaction account to the merchant for use in receiving funds for payment transactions. The acquiring institution 108 may forward a transaction message for the payment transaction that includes the account details and transaction information to a payment network 110 using payment rails associated therewith. The transaction message may be a specially formatted data message that includes one or more data elements that store the account details and other transaction information, where the transaction message may be formatted according to one or more standards, such as the International Organization of Standardization's ISO 8583 or ISO 20022 standards. The payment network 110 may then process the transaction via the transaction message using traditional methods and systems, where the issuing institution 104 and acquiring institution 108 may settle the transaction (e.g., with the appropriate transaction amount being paid from the issuing institution 104 to the acquiring institution 108 and transaction accounts for the consumer and merchant debited and credited, respectively).

In the system 100, the digital wallet executed by the computing device 102 may store tokenized payment cards. A tokenized payment card may be a payment card that is represented by a token identifier, which may be a unique value that represents the associated transaction account that can be used in place of a traditional transaction account number by the consumer. The tokenized payment card may be provisioned to the computing device 102 by a wallet server 112. The wallet server 112 may be a computing system that is configured to provision token identifiers to digital wallets for use in payment transactions, such as the computing systems 200 or 500 illustrated in FIGS. 2 and 5, respectively, discussed in more detail below. The consumer may register their transaction account with the wallet server 112 using the digital wallet on the computing device 102. As part of the registration, the consumer may supply details regarding the transaction account to the wallet server 112. In some cases, the consumer may be required to authenticate themselves. In some instances, the wallet server 112 may request authentication from the issuing institution 104 for the transaction account and/or may request account details from the issuing institution 104. The wallet server 112 may store account details for the transaction account and may generate a token identifier to represent the transaction account. This token identifier may then be electronically transmitted to the computing device 102 and stored in memory accessible by the digital wallet. In some embodiments, the token identifier may be a value other than a 16-digit integer and may thereby be of a different format than the transaction account number for the associated transaction account.

In traditional systems where a digital wallet is used, the computing device 102 may supply the token identifier to the merchant system 106 as an alternative to a traditional transaction account number and other account details. In such systems, the merchant system 106 may be configured to receive token identifiers and may perform a different process upon receipt thereof than in traditional payment transactions using standard transaction account numbers. For instance, the transaction information may be submitted to the wallet server 112 for processing in place of the payment network 110, the token identifier may be transmitted to the wallet server 112, which may return the account details to the merchant system 106 for submission in a standard transaction message, or the transaction details may be provided to the wallet server 112 with the token identifier and the wallet server may generate the transaction message for the payment transaction using the transaction details and the account details for the associated transaction account (e.g., identified using the token identifier provided by the merchant system 106) and submit the transaction message to the payment network 110 for processing.

In standard payment transactions using physical payment cards or in standard digital wallet transactions, there may be opportunities for the transaction account details to be intercepted during transmission. In addition, because the digital wallet includes only the token identifier that is associated with the transaction account, and no transaction account number or other information for the transaction account, the consumer may be unable to use that transaction account in e-commerce transactions that are conducted through websites, application programs, and other interfaces that are not configured to accept token identifiers. As a result, only those merchant systems 106 that are configured to utilize the specific type of token identifier may be available to the consumer.

The system 100 solves this problem through the use of controlled payment numbers. When the consumer is interested in conducting an e-commerce payment transaction and cannot utilize the token identifier, the consumer may request a controlled payment number via the digital wallet on the computing device 102. The computing device 102 may submit a request message to the wallet server 112 using a suitable communication network and method, where the request message includes the token identifier associated with the transaction account that the consumer wants to use in the e-commerce transaction. Once the wallet server 112 has received the request and identifies the token identifier for the transaction account, the wallet server 112 may submit a request for a controlled payment number to a processing server 114 using a suitable communication network and method. The request may include at least the token identifier, and any other additional information that may be necessary. For example, the request may also include one or more transaction controls, as discussed in more detail below.

The processing server 114 may be a computing system configured to perform the functions discussed herein, such as the computing system 200 or 500 illustrated in FIGS. 2 and 5, respectively, discussed in more detail below. The processing server 114 may be configured to facilitate the generation of controlled payment numbers for use by consumers in e-commerce transactions using the computing device 102. The processing server 114 may be configured to store account information for the transaction account as well as token identifiers associated with the transaction account. In some embodiments, the processing server 114 may receive the transaction account information and token identifiers associated therewith from the wallet server 112. In other embodiments, the processing server 114 may receive transaction account information from the issuing institution 104 and token identifiers from the wallet server 112. In some cases, the processing server 114 may be a part of the issuing institution 104 or the payment network 110. In some embodiments, the wallet server 112 may be part of the same network as the processing server 114, but may be implemented in different computing systems that are separate and distinct.

The processing server 114 may receive the request for a controlled payment number from the wallet server 112 that includes the token identifier. The processing server 114 may then identify at least the transaction account number for the transaction account associated with the token identifier in one or more data storage components that may be internal in the processing server 114 or external thereto and accessible thereby.

Once the processing server 114 has identified the transaction account number, a controlled payment number may be generated. In some embodiments, the processing server 114 itself may be configured to generate controlled payment numbers. In other embodiments, the system 100 may include a generating server 116, which may be a computing system separate and distinct from the processing server 114 that is configured to generate controlled payment numbers. A controlled payment number may be a number that is of the same format as a traditional transaction account number, but may be subject to one or more transaction controls, such as controls on transaction amounts, number of transactions, merchants, time and/or date, currency type, transaction type, or a combination thereof. A controlled payment number may be generated for the transaction account and mapped to that transaction account by the processing server 114 or generating server 116, as applicable. In some cases, additional account details may be generated as well as the controlled payment number itself, such as an expiration date, security code, billing zip code, or any other data that may be necessary in order to facilitate an e-commerce transaction. In some instances, the additional account details may be the same as the corresponding details on the actual transaction account.

In some embodiments, the controlled payment number may be limited to a single use. In some cases, the wallet server 112 may provide, in the request for the controlled payment number, additional transaction controls for the controlled payment number, such as may be supplied by the consumer in the request submitted using the computing device 102. For instance, the consumer may supply the name of the merchant and the time and date for the expected e-commerce transaction, where the new controlled payment number may be limited to a single use at that merchant on the specified date and within a predetermined range of the specified time, which may further limit the possibility of fraud. For example, if the controlled payment number is intercepted, not only is the underlying transaction account number protected, but the controlled payment number itself may only be used one time and at the specified time and date at that specific merchant and limited to the specified transaction amount.

Once the controlled payment number is generated and mapped to the transaction account, the processing server 114 may (e.g., once the controlled payment number is received from the generating server 116, if applicable) electronically transmit the controlled payment number, and any additional account details as necessary, to the wallet server 112 using a suitable communication network and method. The wallet server 112 can electronically transmit the controlled payment number and any accompanying details to the computing device 102 using a suitable communication network and method. The computing device 102 may then, via the digital wallet, present the controlled payment number and accompanying details to the consumer. For instance, the computing device 102 may display an image of a payment card with the controlled payment number displayed as the account number on the payment card with the accompanying account details also displayed on the payment card accordingly.

The consumer may then be free to use the controlled payment number in an e-commerce transaction. The consumer may input the controlled payment number and any accompanying account details into the point of sale device of the merchant system 106, such as in a web page of the merchant system 106 or an application program in communication therewith. The data may be collected by the merchant system 106, which may submit the data as account details to the acquiring institution 108 along with transaction information using traditional methods. The acquiring institution 108 may submit a transaction message to the payment network 110 for the payment transaction, where the controlled payment number is submitted as the payment method. The payment network 110 may then process the transaction message using traditional methods. As part of the processing, the transaction message may be routed to the processing server 114 as part of the authorization, such as due to an identifier included in the controlled payment number. For instance, the controlled payment number may include digits that serve as an issuer identification number or bank identification number (e.g., as included in traditional transaction account numbers) that is associated with the processing server 114 where the transaction message may be routed to the processing server 114 as a result of that number.

The processing server 114 may receive the transaction message and may identify that the transaction message includes a controlled payment number. The processing server 114 may then identify the transaction account number that is mapped to the controlled payment number. The controlled payment number (and any other account details for example, as necessary) may be replaced by the transaction account number. The transaction message, with the transaction account number, may then be submitted to the issuing institution 104 for authorization using traditional methods and systems. In cases where transaction controls are applied to the controlled payment number, the processing server 114 may verify compliance with the transaction controls before forwarding the transaction message to the issuing institution 104 for authorization. In instances where the payment transaction may not be in compliance with one or more transaction controls, the processing server 114 may deny the payment transaction. In some embodiments, the generating server 116 may perform the replacement of the controlled payment number as a result of the mapping instead of the processing server 114. The issuing institution 104 may return an authorization response to the processing server 114 for the payment transaction, where the processing server 114 (e.g., or generating server 116, as applicable) may replace the transaction account number with the mapped controlled payment number before forwarding the authorization response to the payment network 110 for finalization of the payment transaction.

The result of the methods and systems discussed herein enable a consumer to use a tokenized payment card in their digital wallet for an e-commerce transaction through the use of a controlled payment number. Using the methods discussed herein, the wallet server 112, computing device 102, merchant system 106, and acquiring institution 108 each never receive or identify the transaction account number, which may result in the maintaining of a high level of security for the transaction account, without sacrificing any of the convenience of the digital wallet for the consumer. In addition, the consumer may be able to use the tokenized payment card, via the controlled payment number, to conduct an e-commerce transaction with any merchant system 106, including those not configured for use of tokenized payment cards. Thus, the methods and systems discussed herein maintain account security while providing extra functionality and consumer convenience.

Computing System

Figure 2:
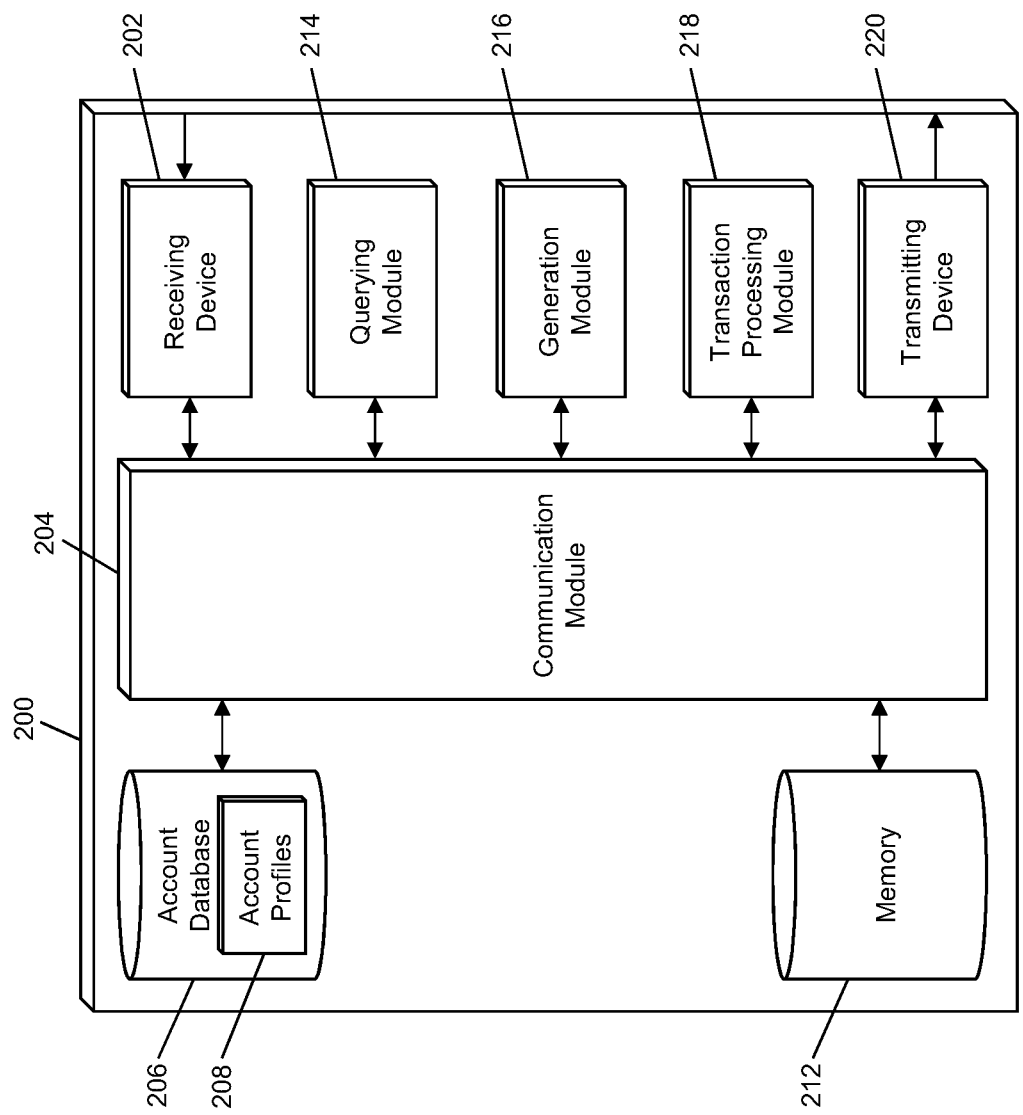
FIG. 2 is a block diagram illustrating a computing system of the system of FIG. 1 for use in supplying controlled payment numbers for use in e-commerce transactions in accordance with exemplary embodiments.

FIG. 2 illustrates an embodiment of a computing system 200, such as may be used as the computing device 102, wallet server 112, processing server 114, generating server 116, etc. in the system 100. It will be apparent to persons having skill in the relevant art that the embodiment of the computing system 200 illustrated in FIG. 2 is provided as illustration only and may not be exhaustive to all possible configurations of the computing system 200 suitable for performing the functions as discussed herein. For example, the computer system 500 illustrated in FIG. 5 and discussed in more detail below may be a suitable configuration of the computing system 200.

The computing system 200 may include a receiving device 202. The receiving device 202 may be configured to receive data over one or more networks via one or more network protocols. In some instances, the receiving device 202 may be configured to receive data from computing devices 102, issuing institutions 104, merchant systems 106, acquiring institutions 108, payment networks 110, wallet servers 112, processing servers 114, generating servers 116, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by computing devices 102 that may be superimposed or otherwise encoded with requests for controlled payment numbers, such as may include token identifiers and one or more transaction control values. The receiving device 202 may also be configured to receive data signals electronically transmitted by wallet servers 112, which may be superimposed or otherwise encoded requests for controlled payment numbers, such as may include token identifiers and one or more transaction control values, or controlled payment numbers and other accompanying account details. The receiving device 202 may be further configured to receive data signals electronically transmitted by payment networks 110, which may be transmitted via payment rails associated therewith, wallet servers 112, issuing institutions 104, or acquiring institutions 108 and superimposed or otherwise encoded with transaction messages. The receiving device 202 may also be configured to receive data signals electronically transmitted by processing servers 114 or generating servers 116, which may be superimposed or otherwise encoded with controlled payment numbers and accompanying account details, transaction messages, mapping data, etc.

The computing system 200 may also include a communication module 204. The communication module 204 may be configured to transmit data between modules, engines, databases, memories, and other components of the computing system 200 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the computing system 200 and external components of the computing system 200, such as externally connected databases, display devices, input devices, etc. The computing system 200 may also include a processing device. The processing device may be configured to perform the functions of the computing system 200 discussed herein as will be apparent to persons having skill in the relevant art. In some embodiments, the processing device may include and/or be comprised of a plurality of engines and/or modules specially configured to perform one or more functions of the processing device, such as a querying module 214, generation module 216, transaction processing module 218, etc. As used herein, the term "module" may be software or hardware particularly programmed to receive an input, perform one or more processes using the input, and provides an output. The input, output, and processes performed by various modules will be apparent to one skilled in the art based upon the present disclosure.

The computing system 200 may also be an account database 206. The account database 206 may be configured to store one or more account profiles 208 using a suitable data storage format and schema. The account database 206 may be a relational database that utilizes structured query language for the storage, identification, modifying, updating, accessing, etc. of structured data sets stored therein. Each account profile 208 may be a structured data set configured to store data related to a transaction account, which may include, for example, token identifier, transaction account numbers, controlled payment numbers, account details, transaction controls, mapping data, authentication information, contact information for computing devices 102, etc.

The computing system 200 may also include a memory 212. The memory 212 may be configured to store data for use by the computing system 200 in performing the functions discussed herein, such as public and private keys, symmetric keys, etc. The memory 212 may be configured to store data using suitable data formatting methods and schema and may be any suitable type of memory, such as read-only memory, random access memory, etc. The memory 212 may include, for example, encryption keys and algorithms, communication protocols and standards, data formatting standards and protocols, program code for modules and application programs of the processing device, and other data that may be suitable for use by the computing system 200 in the performance of the functions disclosed herein as will be apparent to persons having skill in the relevant art. In some embodiments, the memory 212 may be comprised of or may otherwise include a relational database that utilizes structured query language for the storage, identification, modifying, updating, accessing, etc. of structured data sets stored therein. The memory 212 may be configured to store, for example, cryptographic keys, salts, nonces, communication information for other computing systems, mapping information, generation algorithms for controlled payment numbers, transaction control data and compliance rules, etc.

The computing system 200 may include a querying module 214. The querying module 214 may be configured to execute queries on databases to identify information. The querying module 214 may receive one or more data values or query strings, and may execute a query string based thereon on an indicated database, such as the memory 212 of the computing system 200 to identify information stored therein. The querying module 214 may then output the identified information to an appropriate engine or module of the computing system 200 as necessary. The querying module 214 may, for example, execute a query on the account database 206 to identify an account profile 208 that includes a received token identifier, for identification of the transaction account number for a related transaction account, for use in generating and mapping a controlled payment number.

The computing system 200 may also include a generation module 216. The generation module 216 may be configured to generate data for use by the computing system 200 in performing the functions discussed herein. The generation module 216 may receive instructions as input, may generate data based on the instructions, and may output the generated data to one or more modules of the computing system 200. For example, the generation module 216 may be configured to generate controlled payment numbers, which may be mapped to a transaction account and used in place of a transaction account number or token identifier in an electronic payment transaction.

The computing system 200 may also include a transaction processing module 218. The transaction processing module 218 may be configured to perform functions related to the processing of payment transactions including the management of digital wallets, mapping of controlled payment numbers, replacement of data in transaction messages, formatting of transaction messages, forwarding of transaction message, determination of compliance with transaction controls, etc. The transaction processing module 218 may receive instructions and data as input, may perform one or more functions as instructed, and may output the result to another module or engine of the computing system 200. The transaction processing module 218 may, for example, be configured to map a controlled payment number to a transaction account (e.g., in the account database 206), replace a controlled payment number in a transaction message with a transaction account number and the reverse, determine if one or more transaction controls are complied with for an e-commerce payment transaction based on the transaction details, etc.

The computing system 200 may also include a transmitting device 220. The transmitting device 220 may be configured to transmit data over one or more networks via one or more network protocols. In some instances, the transmitting device 220 may be configured to transmit data to computing devices 102, issuing institutions 104, merchant systems 106, acquiring institutions 108, payment networks 110, wallet servers 112, processing servers 114, generating servers 116, and other entities via one or more communication methods, local area networks, wireless area networks, cellular communication, Bluetooth, radio frequency, the Internet, etc. In some embodiments, the transmitting device 220 may be comprised of multiple devices, such as different transmitting devices for transmitting data over different networks, such as a first transmitting device for transmitting data over a local area network and a second transmitting device for transmitting data via the Internet. The transmitting device 220 may electronically transmit data signals that have data superimposed that may be parsed by a receiving computing device. In some instances, the transmitting device 220 may include one or more modules for superimposing, encoding, or otherwise formatting data into data signals suitable for transmission.

The transmitting device 220 may be configured to electronically transmit data signals to wallet servers 112 or processing servers 114 that may be superimposed or otherwise encoded with requests for controlled payment numbers, such as may include token identifiers and one or more transaction control values. The transmitting device 220 may also be configured to electronically transmit data signals to wallet servers 112, processing servers 114, or generating servers 116, which may be superimposed or otherwise encoded requests for controlled payment numbers, such as may include token identifiers and one or more transaction control values. The transmitting device 220 may be further configured to electronically transmit data signals to payment networks 110, which may be transmitted via payment rails associated therewith, wallet servers 112, issuing institutions 104, or acquiring institutions 108 and superimposed or otherwise encoded with transaction messages. The transmitting device 220 may also be configured to electronically transmit data signals to wallet servers 112 or computing devices 102, which may be superimposed or otherwise encoded with controlled payment numbers and accompanying account details, transaction messages, mapping data, etc.

Process for Conducting E-Commerce Transactions

Figure 3A:
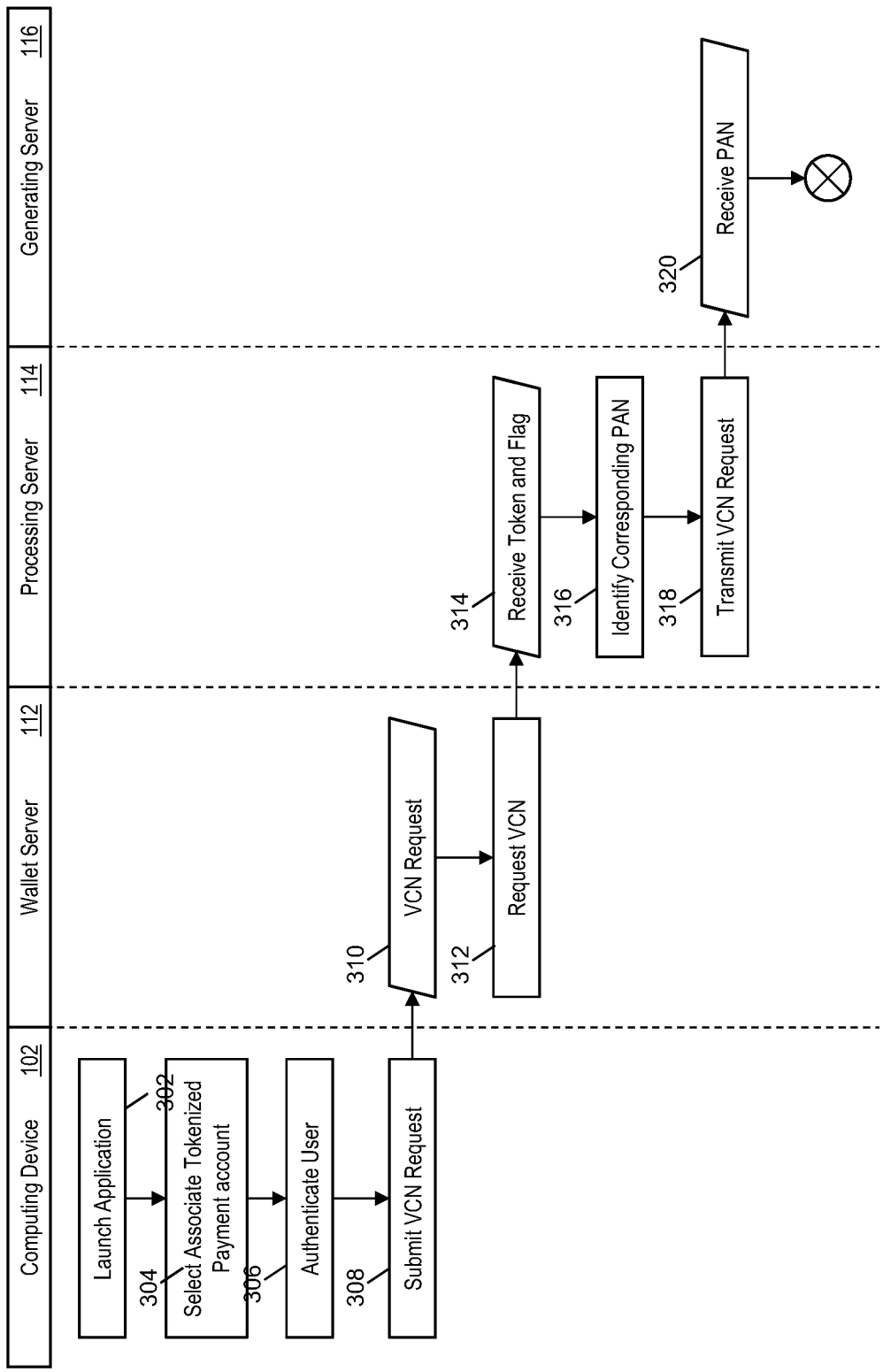
FIGS. 3A and 3B are a flow diagram illustrating a process supplying controlled payment numbers for tokenized payment cards in the system of FIG. 1 in accordance with exemplary embodiments.
Figure 3B:
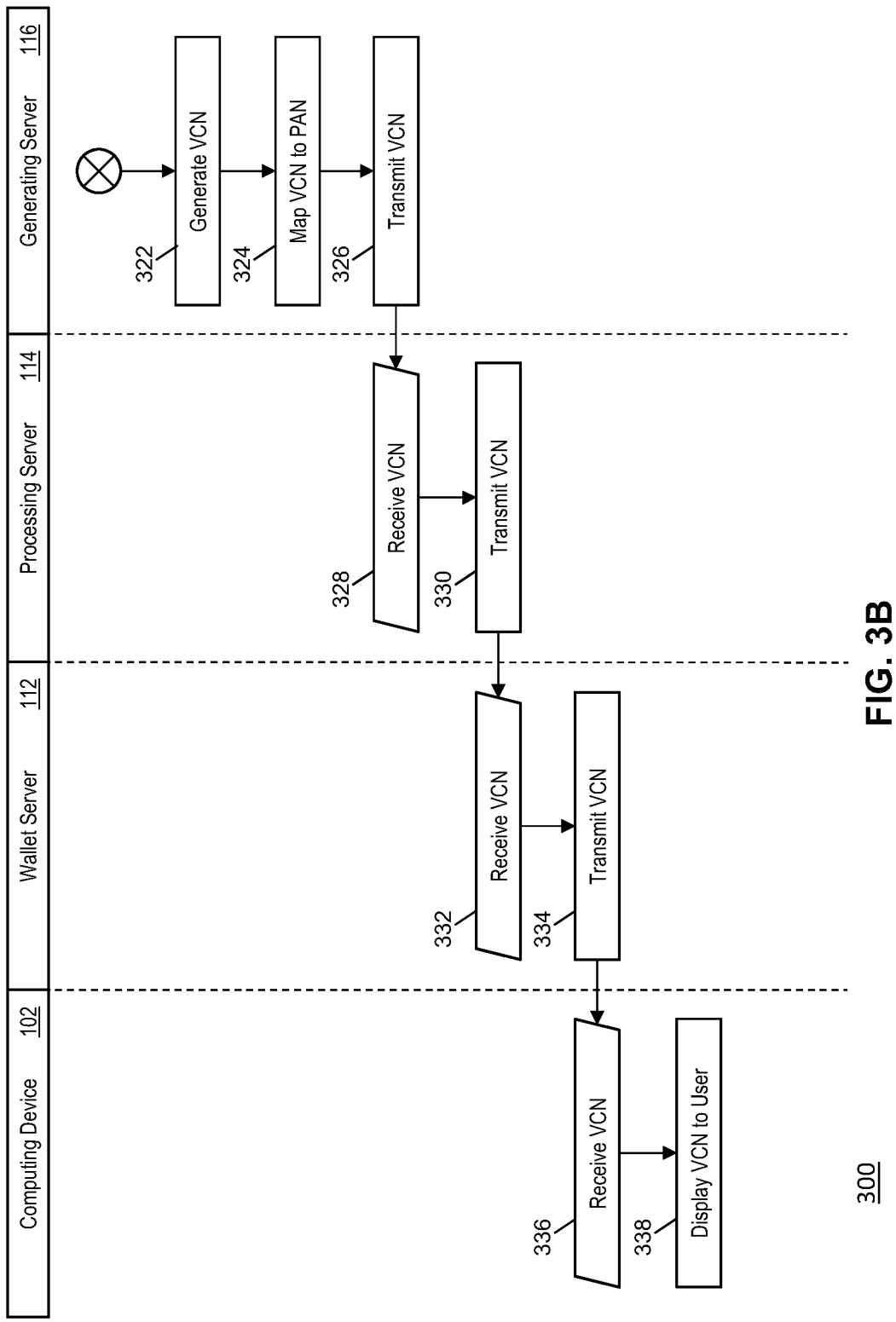

FIGS. 3A and 3B illustrate a process 300 for supplying a controlled payment number for use in an e-commerce transaction on behalf of a tokenized payment account in a digital wallet.

In step 302, the computing device 102 may launch a digital wallet application for use by a consumer as a user thereof. In step 304, the user may select, using the digital wallet application of the computing device 102, a tokenized payment account as being associated with the desired transaction account for use in funding an e-commerce transaction. As part of the selection, the user may select that a controlled payment number is being requested, that the account is to be used for an e-commerce transaction, or otherwise give an indication that a controlled payment number needs to be generated for use of the transaction account for a transaction. In step 306, the computing device 102 may, via the digital wallet application, authenticate the user as being an authorized user of the selected transaction account, such as via biometrics, a password, or other suitable authentication method.

In step 308, the computing device 102 may electronically transmit (e.g., via a transmitting device 220) a request for a controlled payment number, also referred to herein as a "virtual card number" (VCN), to the wallet server 112 using a suitable communication network and method. The request may include at least the token identifier of the tokenized payment account as stored in or accessed by the digital wallet. In step 310, the wallet server 112 may receive (e.g., via a receiving device 202) the VCN request from the computing device 102. In step 312, the wallet server 112 may electronically transmit (e.g., via a transmitting device 220) the VCN request to the processing server 114 using a suitable communication network and method. The VCN request may still include the token identifier and may include any additional information necessary for use in supplying a controlled payment number as discussed herein, such as a flag that indicates that a controlled payment number is being requested. In step 314, the processing server 114 may receive (e.g., via a receiving device 202) the token identifier and flag from the wallet server 112.

In step 316, the processing server 114 may identify (e.g., in an account profile 208 via a query to an account database 206 by a querying module 214) a transaction account number, also referred to herein as a "primary account number" (PAN), that is associated with the transaction account that corresponding to the received token identifier. In step 318, the processing server 114 may transmit (e.g., via a transmitting device 220) a VCN request to the generating server 116 via a suitable communication network and method. The VCN request may include at least the PAN, and include any other suitable information, such as any applicable transaction controls or desired accompanying details. In step 320, the generating server 116 may receive (e.g., via a receiving device 202) the PAN with the VCN request from the processing server 114.

In step 322, the generating server 116 may generate (e.g., via a generation module 216) the controlled payment number for the transaction account. In step 324, the generating server 116 may map the generated controlled payment number to the transaction account number for the transaction account, to be swapped with the transaction account number during the authorization process for the e-commerce payment transaction. In step 326, the generating server 116 may electronically transmit (e.g., via a transmitting device 220) the generated controlled payment number to the processing server 14 using a suitable communication network and method. In step 328, the processing server 114 may receive (e.g., via a receiving device 202) the VCN, and any other additional account details, as applicable, from the generating server 116. In step 330, the processing server 114 may transmit the VCN (e.g., and any other data) to the wallet server 112 for receipt thereby, in step 332. In step 334, the wallet server 112 may electronically transmit the controlled payment number to the computing device 102. In step 336, the computing device 102 may receive the controlled payment number from the wallet server 112. In step 338, the computing device 102 may display, on a display interfaced therewith, the controlled payment number and any other accompanying account details to the user, which the user may then submit to a merchant system 106 for an e-commerce payment transaction.

Exemplary Method for Supplying a Controlled Payment Number

FIG. 4 illustrates a method 400 for supplying a controlled payment number for use on behalf of a tokenized payment account in a digital wallet for e-commerce.

In step 402, at least a token identifier may be received (e.g., via a receiving device 202) by a wallet server (e.g., wallet server 112) from an external computing device (e.g., computing device 102), the token identifier being associated with a tokenized payment account in the external computing device. In step 404, at least the token identifier and a request flag may be transmitted (e.g., via a transmitting device 220) by the wallet server to a processing server (e.g., processing server 114). In step 406, the processing server may identify a transaction account number associated with the token identifier, wherein the transaction account number corresponds to the payment account.

In step 408, a controlled payment number corresponding to the transaction account may be identified by the processing server. In step 410, the identified controlled payment number may be received by the wallet server from the processing server. In step 412, the identified controlled payment number may be transmitted by the wallet server to the external computing device.

In one embodiment, the external computing device and wallet server may never receive or possess the transaction account number. In some embodiments, the controlled payment number may be subject to one or more transaction controls. In a further embodiment, the controlled payment number may be a one-time use number. In one embodiment, identifying the controlled payment number may include: transmitting, by the processing server, the transaction account number to a generation server (e.g., generating server 116); generating, by the generation server, the controlled payment number; mapping, by the generation server, the controlled payment number to the transaction account number; and receiving, by the processing server, the controlled payment number from the generation server.

In some embodiments, identifying the controlled payment number may include: generating, by the processing server, the controlled payment number; and mapping, by the processing server, the controlled payment number to the transaction account number. In one embodiment, the method 400 may further include: receiving, by the processing server, a transaction message for an electronic payment transaction, the transaction message being formatted according to one or more standards and including a plurality of data elements, the plurality of data elements storing at least the controlled payment number; and replacing, by the processing server, the controlled payment number in the transaction message with the transaction account number. In a further embodiment, the one or more standards may include at least one of the ISO 8583 or ISO 20022 standards.

Computer System Architecture

Figure 5:
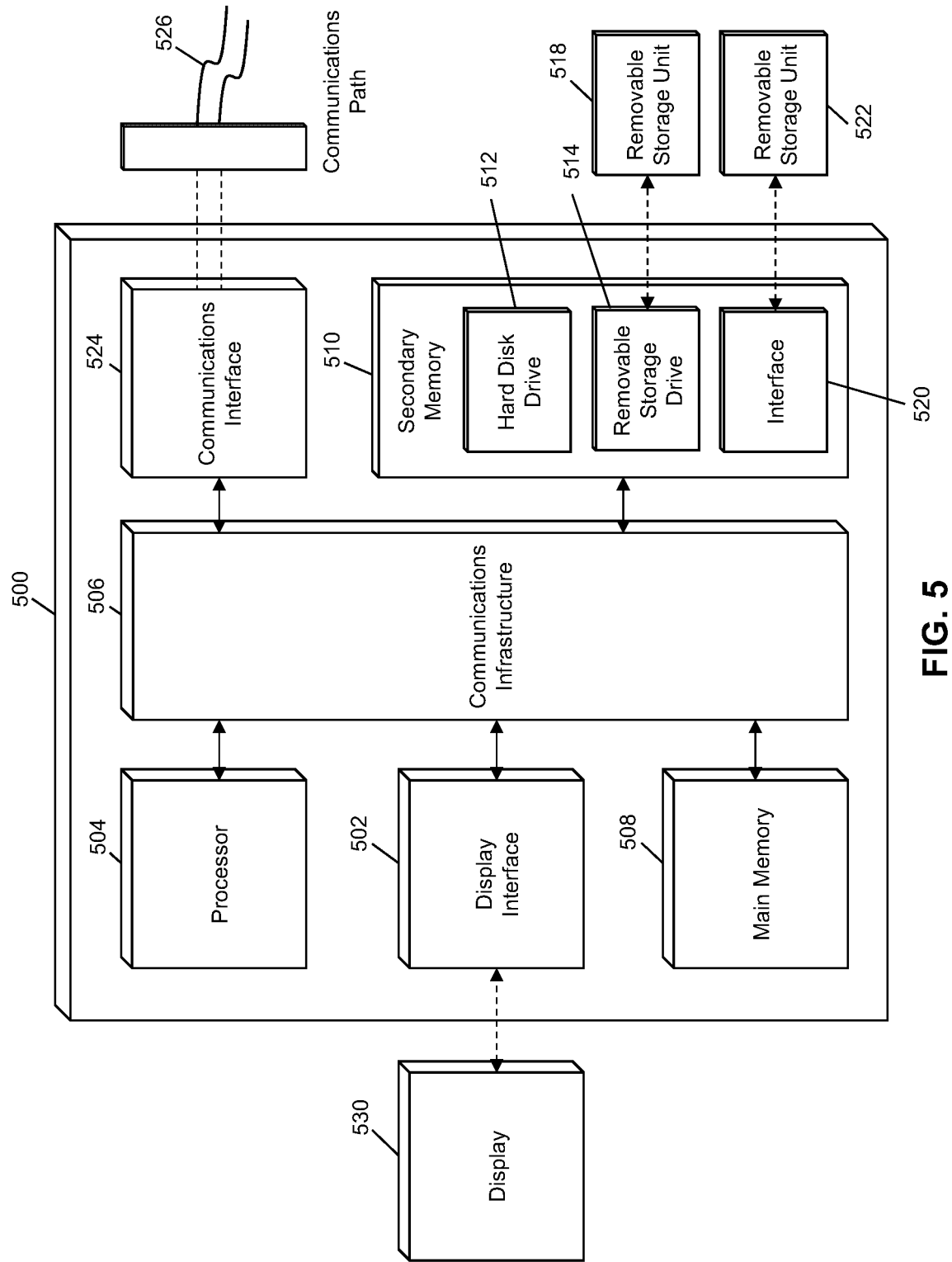
FIG. 5 is a block diagram illustrating a computer system architecture in accordance with exemplary embodiments.

FIG. 5 illustrates a computer system 500 in which embodiments of the present disclosure, or portions thereof, may be implemented as computer-readable code. For example, the computing device 102, wallet server 112, processing server 114, and generating server 116 of FIG. 1 and computing system 200 of FIG. 2 may be implemented in the computer system 500 using hardware, non-transitory computer readable media having instructions stored thereon, or a combination thereof and may be implemented in one or more computer systems or other processing systems. Hardware may embody modules and components used to implement the methods of FIGS. 3A, 3B, and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3A, 3B, and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for supplying a controlled payment number for use on behalf of a tokenized payment account in a digital wallet for e-commerce. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for supplying a controlled payment number (CPN) for use on behalf of a tokenized payment account in a digital wallet for e-commerce, comprising:
   receiving, by a wallet server, at least a token identifier from an external computing device, the token identifier being associated with a tokenized payment account in the external computing device, wherein neither the wallet server nor the external computing device possesses nor transmits a transaction account number associated with the token identifier;
   transmitting, by the wallet server, at least the token identifier and a request flag to a processing server indicating a request for the CPN;
   receiving, by the processing server, at least the token identifier and the request flag from the wallet server;
   identifying, by the processing server, the transaction account number associated with the token identifier, wherein the transaction account number corresponds to the payment account;
   identifying, by the processing server, the CPN corresponding to the payment account;
   receiving, by the wallet server, the identified controlled payment number from the processing server; and
   transmitting, by the wallet server, the identified controlled payment number to the external computing device.

2. The method of claim 1, wherein the controlled payment number is subject to one or more transaction controls.

3. The method of claim 2, wherein the controlled payment number is a one-time use number.

4. The method of claim 1, wherein identifying the controlled payment number comprises:
   transmitting, by the processing server, the transaction account number to a generation server;
   generating, by the generation server, the controlled payment number;
   mapping, by the generation server, the controlled payment number to the transaction account number; and
   receiving, by the processing server, the controlled payment number from the generation server.

5. The method of claim 1, wherein identifying the controlled payment number comprises:
   generating, by the processing server, the controlled payment number; and
   mapping, by the processing server, the controlled payment number to the transaction account number.

6. The method of claim 1, further comprising:
   receiving, by the processing server, a transaction message for an electronic payment transaction, the transaction message being formatted according to one or more standards and including a plurality of data elements, the plurality of data elements storing at least the controlled payment number; and
   replacing, by the processing server, the controlled payment number in the transaction message with the transaction account number.

7. The method of claim 6, wherein the one or more standards includes at least one of the ISO 8583 or ISO 20022 standards.

8. A system for supplying a controlled payment number (CPN) for use on behalf of a tokenized payment account in a digital wallet for e-commerce, comprising:
   an external computing device;
   a wallet server; and
   a processing server, wherein
   the wallet server
      receives at least a token identifier from the external computing device, the token identifier being associated with a tokenized payment account in the external computing device, wherein neither the wallet server nor the external computing device possesses nor transmits a transaction account number associated with the token identifier, and
      transmits at least the token identifier and a request flag to the processing server, the processing server indicating a request for the CPN,
      receives at least the token identifier and the request flag from the wallet server,
      identifies the transaction account number associated with the token identifier, wherein the transaction account number corresponds to the payment account,
      identifies the CPN corresponding to the payment account, and
      transmits the controlled payment number to the wallet server, and the wallet server further
      receives the identified controlled payment number from the processing server, and
      transmits the identified controlled payment number to the external computing device.

9. The system of claim 8, wherein the controlled payment number is subject to one or more transaction controls.

10. The system of claim 9, wherein the controlled payment number is a one-time use number.

11. The system of claim 8, further comprising:
a generation server, wherein
identifying the controlled payment number comprises:
   transmitting, by the processing server, the transaction account number to the generation server;
   generating, by the generation server, the controlled payment number;
   mapping, by the generation server, the controlled payment number to the transaction account number; and
   receiving, by the processing server, the controlled payment number from the generation server.

12. The system of claim 8, wherein identifying the controlled payment number comprises:
   generating, by the processing server, the controlled payment number; and
   mapping, by the processing server, the controlled payment number to the transaction account number.

13. The system of claim 8, further comprising:
   receiving, by the processing server, a transaction message for an electronic payment transaction, the transaction message being formatted according to one or more standards and including a plurality of data elements, the plurality of data elements storing at least the controlled payment number; and
   replacing, by the processing server, the controlled payment number in the transaction message with the transaction account number.

14. The system of claim 13, wherein the one or more standards includes at least one of the ISO 8583 or ISO 20022 standards.

* * * * *